US012705099B2

(12) United States Patent
Verma et al.

(10) Patent No.: US 12,705,099 B2
(45) Date of Patent: Aug. 11, 2026

(54) PROVIDING AI-GENERATED CONTENT

(71) Applicant: MICROSOFT TECHNOLOGY LICENSING, LLC, Redmond, WA (US)

(72) Inventors: Shubham Verma, Patiala (IN); Ankur Singla, Uttar Pradesh (IN); Archit Shukla, Hyderabad (IN); Sagar Taneja, Delhi (IN); Saboohi Dhawan, Faridabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 583 days.

(21) Appl. No.: 18/104,571

(22) Filed: Feb. 1, 2023

(65) Prior Publication Data

US 2024/0256337 A1 Aug. 1, 2024

(51) Int. Cl.
*G06F 9/50* (2006.01)

(52) U.S. Cl.
CPC .................................. *G06F 9/5011* (2013.01)

(58) Field of Classification Search
None
See application file for complete search history.

(56) References Cited

U.S. PATENT DOCUMENTS

2015/0067296 A1* 3/2015 Basu .................. G06F 12/1009 711/206
2015/0379424 A1* 12/2015 Dirac ..................... G06N 20/00 706/12

(Continued)

FOREIGN PATENT DOCUMENTS

CN 111858954 A 10/2020

OTHER PUBLICATIONS

Lu, Xiaopeng, Kyusong Lee, and Tiancheng Zhao. "SF-QA: Simple and Fair Evaluation Library for Open-domain Question Answering." In Proceedings of the 16th Conference of the European Chapter of the Association for Computational Linguistics: System Demonstrations, pp. 7-13. 2021. (Year: 2021).*

(Continued)

*Primary Examiner* — Frank D Mills
(74) *Attorney, Agent, or Firm* — Benjamin A. Keim; Newport IP, LLC

(57) ABSTRACT

A cognitive content service exposes an interface for providing artificial intelligence ("AI")-generated content based on content templates that define when and how AI-generated content is to be generated. Requests made to the API for AI-generated content identify a content template. The cognitive content service determines, based on the identified content template, whether the requested AI-generated content is to be newly generated or whether previously generated AI-generated content is to be returned in response to the request. If the requested AI-generated content is to be newly generated, the cognitive content service transmits a request to a content generation service to generate the AI-generated content based on the content template. The content generation service generates the requested content based on the content template. The cognitive content service stores the AI-generated content and generates a response to the request for the AI-generated content.

20 Claims, 10 Drawing Sheets

PROVIDING AI-GENERATED CONTENT (OVERVIEW)

(56) References Cited

U.S. PATENT DOCUMENTS

| | | | | |
|---|---|---|---|---|
| 2019/0332358 | A1 | 10/2019 | Ganesh et al. | |
| 2020/0038748 | A1* | 2/2020 | Wu | A63F 13/422 |
| 2021/0112059 | A1* | 4/2021 | Heldman | H04L 63/0807 |
| 2021/0158815 | A1 | 5/2021 | Lee | |
| 2022/0206947 | A1* | 6/2022 | Song | G06F 12/0875 |
| 2022/0318248 | A1* | 10/2022 | Liang | G06F 16/90332 |
| 2022/0353109 | A1* | 11/2022 | Elliott | H04L 67/01 |

OTHER PUBLICATIONS

"DeepAI: Text io Image—AI Image Generator API", Retrieved From: https://deepai.org/machine-learning-model/text2img, Retrieved Date: Oct. 31, 2022, 11 Pages.

Kundu, Rohit, "V7: AI-Generated Art: From Text to Images & Beyond [Examples]", Retrieved From: https://www.v7labs.com/blog/ai-generated-art, Oct. 25, 2022, 47 Pages.

Rashad, Fathy, "Text2Art: How I built an AI Text-to-Art Generator", Retrieved From: https://towardsdatascience.com/how-i-built-an-ai-text-to-art-generator-a0c0f6d6f59f, Oct. 2, 2021, 29 Pages.

Anonymous: "4 Critical API Caching Practices All Developers Should Know TechTarget", Jan. 31, 2023, Retrieved from URL: https://www.techtarget.com/searchsoftwareguality/tip/Critical-API-caching-practices-all-developers-should-know, Retrieved date: May 24, 2024, pp. 1-6.

Anonymous: "Enabling API Caching to Enhance Responsiveness PDF," Jan. 15, 2023, Retrieved from the URL: https://web.archive.org/web/20230115002531/https://docs.aws.amazon.com/apigateway/latest/developerguide/api-gateway-caching.html, Retrieved date: May 24, 2024, pp. 1-9.

International Search Report and Written Opinion received for PCT Application No. PCT/US2024/013882, Jun. 6, 2024, 13 pages.

International Preliminary Report on Patentability received for PCT Application No. PCT/US2024/013882, mailed on Aug. 14, 2025, 07 pages.

* cited by examiner

PROVIDING AI-GENERATED CONTENT (OVERVIEW)

CREATE AND PERSIST CONTENT TEMPLATES

FIG. 4

PROCESS CALLS TO API FOR PROVIDING AI-GENERATED CONTENT

OBTAIN AND PERSIST AUDITING DATA DESCRIBING GENERATION OF AI-GENERATED CONTENT

PROCESS CALLS TO API FOR PROVIDING AI-GENERATED CONTENT (CONT)

PROVIDING AI-GENERATED CONTENT

BACKGROUND

New digital content has historically been created by authors, artists, film makers, musicians, and other types of creators. However, advances in generative artificial intelligence ("AI") have led to the creation of computer-implemented technologies that can generate new content (referred to herein as "AI-generated content") based on existing content, such as text, images, video, or audio. For instance, an implementation of a generative AI algorithm can be configured to create a new image, story, song, or other type of digital content based on a user-provided text string.

Generative AI technologies such as those described briefly above can be exposed in various ways, such as via network services application programming interfaces ("APIs"). Textual, visual, audible, and other types of content can be provided to such APIs as input and, in response thereto, the APIs will return AI-generated content based on the input. For example, a call to such an API could include the word "orange." In response to such a call, a new image of an orange would be created utilizing generative AI techniques and returned in response to the call.

Existing mechanisms for exposing functionality for creating AI-generated content suffer from a number of technical problems. For example, calls to existing APIs for obtaining AI-generated content commonly utilize significant computing resources, such as processor time and memory. Processing each call is costly and, as a result, responses to requests for AI-generated content are often returned with significant latency, typically on the order of seconds to minutes.

SUMMARY

Technologies are disclosed herein for providing AI-generated content. Through implementations of the disclosed technologies, the utilization of computing resources when providing AI-generated content can be reduced. For example, embodiments of the disclosed technologies can reduce the amount of processor time, compute cluster utilization, memory usage, and energy consumption when providing AI-generated content. Embodiments of the disclosed technologies can also reduce the latency experienced when calling APIs or other interfaces that provide AI-generated content. Other technical benefits not specifically mentioned herein might also be realized through implementations of the disclosed subject matter.

In order to provide aspects of the functionality disclosed herein, a cognitive content service is provided that receives and responds to requests for AI-generated content. The AI-generated content is created using generative AI models, in an embodiment. Generative AI refers to unsupervised and semi-supervised machine learning algorithms that enable the use of existing digital content, such as textual, visual, or audible content, to create new content.

In an embodiment, a generative adversarial network ("GAN"), or networks, is used to create the AI-generated content. In another embodiment, a transformer-based model is used to create the AI-generated content. Another type of AI model is used to generate content in another embodiment. Multiple generative AI models are used in combination in another embodiment.

The cognitive content service exposes one or more interfaces for providing AI-generated content. For instance, in an embodiment, the cognitive content service exposes a network services API through which callers to the API can obtain AI-generated content, such as text, images, video, or audio. Another type of interface for obtaining AI-generated content, such as a graphical user interface ("GUI"), is provided in another embodiment.

In an embodiment, the exposed interface provides functionality through which content templates can be submitted to the cognitive content service for storage and utilization in the manner described below. Content templates include data structures that define when and how requested AI-generated content is to be generated. For instance, in an embodiment, content templates specify a cognition type. The specified cognition type defines the conditions under which new AI-generated content is to be generated, or not generated, in response to a request submitted to the interface. In an embodiment, a content template can specify that cold, warm, or hot cognition is to be utilized.

When a content template specifies that cold cognition is to be used, an identifier for an instance of previously generated AI-generated content is returned in response to requests for the AI-generated content, in an embodiment. When hot cognition is specified by a content template, new AI-generated content is generated and returned in response to requests for the AI-generated content, in an embodiment.

When warm cognition is specified by a content template, the determination as to whether new AI-generated content is to be generated is made based upon a refresh policy defined by the content template, in an embodiment. The refresh policy defines the conditions under which new AI-generated content is to be generated, or not generated, in an embodiment. For example, the refresh policy specifies the amount of time after which new AI-generated content is to be generated in response to a request, in an embodiment.

Requests for AI-generated content made to the interface include an identifier for a content template, in an embodiment. When such a request is received, the cognitive content service determines, based on the identified content template, whether the requested AI-generated content is to be generated or whether previously generated AI-generated content is to be returned in response to the request, in an embodiment. For instance, in an embodiment, the cognitive content service utilizes the cognition type specified by the identified content template to make this determination.

If the cognitive content service determines that the requested AI-generated content is not to be generated, the cognitive content service returns a response to the request that includes an identifier for previously generated and stored AI-generated content. If the cognitive content service determines that the requested AI-generated content is to be newly generated, the cognitive content service selects a content generation service to generate the requested AI-generated content, in an embodiment. The content generation service is a network service that implements AI techniques, such as the generative AI techniques described briefly above, to create AI-generated content.

The cognitive content service selects the content generation service based on data in the content template, in an embodiment. For instance, in an embodiment, data in the content template specifies a particular content generation service that is to be used to satisfy requests based on the content template. The content templates include other types of data for use by the content generation service in selecting a content generation service for satisfying a particular request for AI-generated content in another embodiment.

The cognitive content service transmits a request to the selected content generation service to generate the AI-generated content based on the content template, in an embodiment. The content generation service generates the requested content based on data in the identified content template such as, for example, data identifying the type of content (e.g., text or an image) to be input to an AI model implemented by the content generation service, data identifying the type of content (e.g., text or an image) to be output by the AI model implemented by the content generation service, and data describing aspects of the content to be created.

In an embodiment, the content templates define default parameters for use by the content generation service in generating the AI-generated content. In an embodiment, the request for the AI-generated content submitted to the interface includes one or more parameters that are used to generate the AI-generated content instead of the default parameters specified by the content template. The default parameters are utilized to generate the AI-generated content if the request submitted to the interface does not specify parameters, in an embodiment.

The content generation service returns a response to the request from the cognitive content service that includes the AI-generated content, in an embodiment. In an embodiment, the response provided by the content generation service also includes data identifying components utilized by the content generation service to generate the AI-generated content. For instance, the response provided by the content generation service includes data identifying a model utilized to generate the AI-generated content, data identifying a version of the model, data describing a training history of the model, or data describing the infrastructure utilized to execute the model, according to embodiments. As will be described in greater detail below, this data can be utilized for governance, auditing, and potentially other purposes.

The cognitive content service stores the AI-generated content received from the content generation service and generates a response to the request for the AI-generated content. In an embodiment, the response to the request for the AI-generated content includes an identifier for the AI-generated content that can be used to retrieve the AI-generated content from the cognitive content service. For instance, in an embodiment, the identifier is a uniform resource locator ("URL") that can be utilized to obtain the AI-generated content from the interface exposed by the cognitive content service.

The above-described subject matter is implemented as a computer-controlled apparatus, a computer-implemented method, a processing system, or as an article of manufacture such as a computer readable medium in various embodiments disclosed herein. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a flow diagram showing a routine that illustrates aspects of the example mechanism shown in FIGS. 1-3 for creating and persisting content templates for use in providing AI-generated content, in an embodiment:

DETAILED DESCRIPTION

The following detailed description is directed to technologies for providing AI-generated content. As discussed briefly above, advances in generative AI have led to computer-implemented technologies that can produce AI-generated content. These technologies can be exposed in various ways, such as via network services APIs. Textual, visual, audible, or another type of content can be provided to such APIs as input. In response thereto, the APIs will return AI-generated content that has been created based upon the input.

As also discussed briefly above, existing mechanisms for exposing functionality for creating AI-generated content suffer from a number of technical problems. For example, existing APIs for obtaining AI-generated content create new content each time a call is received. Generating new content in response to each request causes current solutions to utilize significant computing resources, such as processor time and memory. Additionally, processing each call is costly and, as a result, responses to requests for AI-generated content are often returned by current solutions with significant latency, typically on the order of seconds to minutes.

Other technical challenges with existing technologies for exposing functionality for obtaining AI-generated content include the inability to cache AI-generated content, the inability to govern bias, racism, and other undesirable attributes of input to and output from AI-based content generation systems, and the inability to apply and audit policies uniformly at the API level in such systems. It is with respect to these and other considerations that the disclosure made herein is presented.

Figure 1:
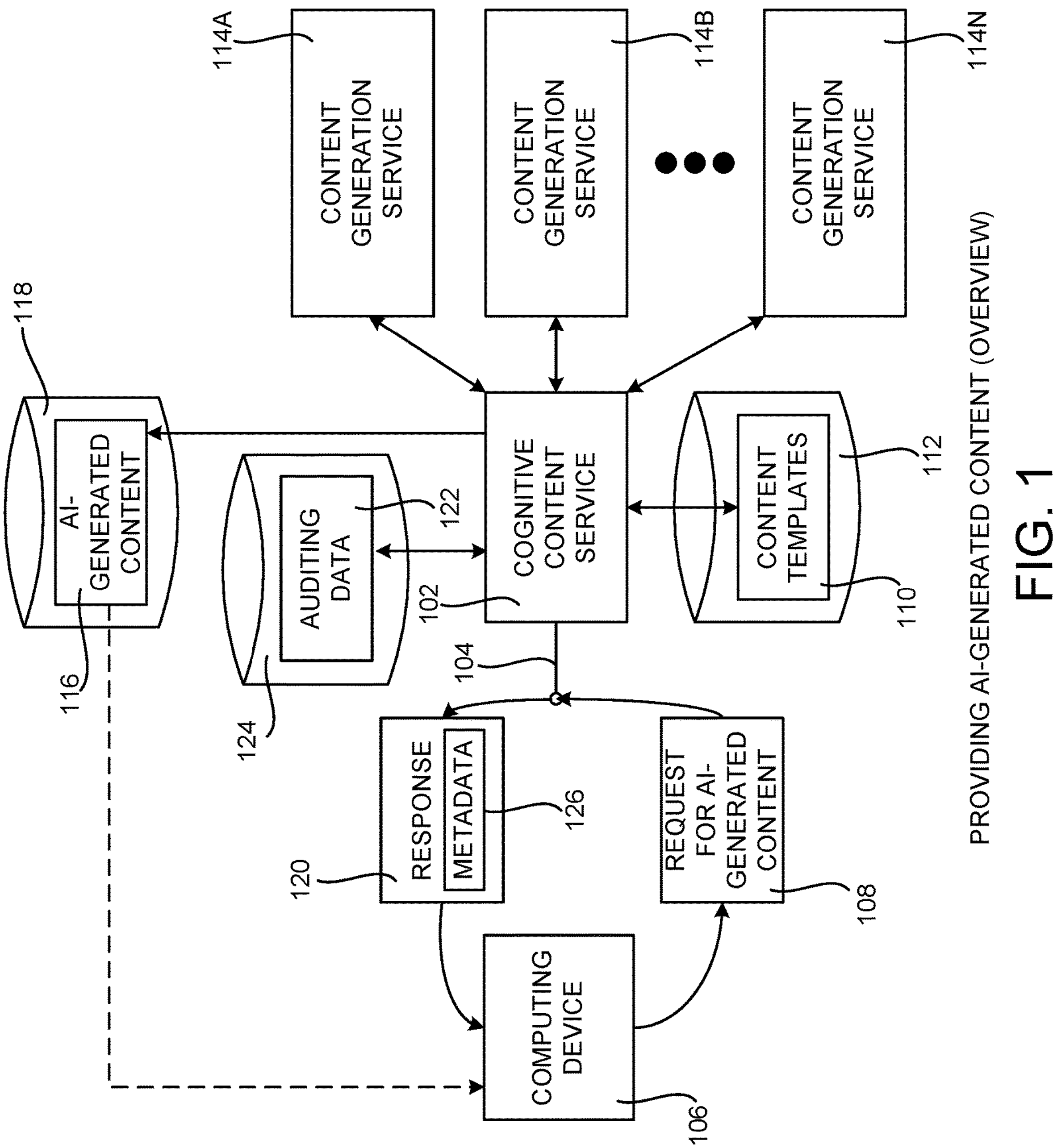
FIG. 1 is a computing system diagram illustrating aspects of a system for providing AI-generated content, in an embodiment.

FIG. 1 is a computing system diagram showing aspects of an illustrative system for providing AI-generated content, in an embodiment. As described briefly above, a cognitive content service 102 is disclosed herein that receives and responds to requests 108 for AI-generated content 116, in an embodiment. The AI-generated content 116 provided by the cognitive content service 102 is created using generative AI models, in an embodiment. Generative AI refers to unsupervised and semi-supervised machine learning algorithms that enable the use of existing digital content, such as textual, visual, or audible content, to create new content.

In an embodiment, a GAN, or GANs, is used to create the AI-generated content 116. In another embodiment, a transformer-based model is used to create the AI-generated content 116. Another type of AI model, or combination of models, is used to generate the AI-generated content 116 in another embodiment. Additional details regarding the generation of the AI-generated content 116 will be provided below.

In an embodiment, the cognitive content service 102 is a network service that exposes one or more interfaces for providing AI-generated content 116. For instance, in an embodiment, the cognitive content service 102 exposes a network services API 104 through which callers to the API 104, such as the computing device 106, can obtain AI-generated content 116, such as text, images, video, or audio. The cognitive content service 102 provides another type of interface, or interfaces, for obtaining the AI-generated content 116, such as a GUI or a command line interface ("CLI"), in another embodiment.

In an embodiment, the exposed interface (e.g., the API 104) provides functionality through which content templates 110 can be submitted to the cognitive content service 102 for storage, such as in an appropriate data store 112, and utilization in the manner described below. The content templates 110 include one or more data structures that define when requested AI-generated content 116 is to be generated. In an embodiment, the content templates 110 also include one or more data structures that define how requested AI-generated content 116 is to be generated. Details regarding one illustrative mechanism for submitting content templates 110 to the cognitive content service 102 will be provided below with respect to FIGS. 2 and 4.

As will be described in greater detail below, the content templates 110 specify a cognition type in an embodiment. The specified cognition type defines the conditions under which new AI-generated content 116 is to be generated, or not generated, in response to a request 108 submitted to the interface (e.g., the API 104) exposed by the cognitive content service 102. In an embodiment, the content templates 110 can specify that cold, warm, or hot cognition is to be utilized.

When a content template 110 identified by a request 108 specifies that cold cognition is to be used, an identifier for an instance of previously generated AI-generated content 116 is returned in a response 120 to a request 108 for the AI-generated content 116, in an embodiment. When hot cognition is specified by a content template 110, new AI-generated content 116 is generated and returned in response to the request 108 for the AI-generated content 116, in an embodiment.

When warm cognition is specified by a content template 110, the determination as to whether new AI-generated content 116 is to be generated in response to a request 108 is made based upon a refresh policy defined by the content template 110, in an embodiment. The refresh policy defines the conditions under which new AI-generated content 116 is to be generated, or not generated, in an embodiment. For example, the refresh policy specifies the amount of time after which new AI-generated content 116 is to be generated in response to a request 108, in an embodiment. Additional details regarding the structure and content of an illustrative content template 110 will be provided below with respect to FIG. 3.

Requests 108 for AI-generated content 116 made to the interface (e.g., the API 104) exposed by the cognitive content service 102 include an identifier for a content template 110, in an embodiment. When such a request 108 is received, the cognitive content service 102 determines, based on the identified content template 110, whether the requested AI-generated content 116 is to be newly generated or whether previously generated AI-generated content 116 stored in a data store 118 is to be returned in response to the request 108, in an embodiment. For instance, in an embodiment, the cognitive content service 102 utilizes the cognition type specified by the identified content template 110 to make this determination.

If the cognitive content service 102 determines that the requested AI-generated content 116 is not to be generated, the cognitive content service 102 returns a response 120 to the request 108 that includes metadata 126 including an identifier for AI-generated content 116 that was previously generated (e.g., content 116 generated in response to a previous request 108). For instance, in an embodiment, the cognitive content service 102 returns a URL that can be utilized to retrieve the previously generated AI-generated content 116 from the cognitive content service 102.

If the cognitive content service 102 determines that the requested AI-generated content 116 is to be generated, the cognitive content service 102 selects one of the content generation services 114A-114N (which may be referred to herein collectively as "the content generation services 114" or individually as "a content generation service 114") to generate the requested AI-generated content 116, in an embodiment. The content generation services 114A-114N are network services that implement AI techniques, such as the generative AI techniques described briefly above, to create AI-generated content 116, in an embodiment. Examples of content generation services 114 include the open source CYCLEGAN and PIX2PIX GANs, the PHOTO2CARTOON GAN, the TEXT-TO-IMAGE Generative Adversarial Text image synthesizer, and the SRGAN open source photo-realistic single image to super-resolution network GAN.

The cognitive content service 102 selects a content generation service 114 to generate content in response to a specific request 108 based on data in the content template 110 identified by the request 108, in an embodiment. For instance, in an embodiment, data in the identified content template 110 specifies a particular content generation service 114 that is to be used to satisfy requests based on the content template 110. The content templates 110 include other types of data for use by the cognitive content service 102 in selecting a content generation service 114 for satisfying a particular request 108 for AI-generated content 116 in another embodiment. Additional details regarding the structure and content of an illustrative content template 110 will be provided below with regard to FIG. 3.

The cognitive content service 102 transmits a request to the selected content generation service 114 to generate the AI-generated content 116 based on the content template 110, in an embodiment. The selected content generation service 114, in turn, generates the requested content based on data in the identified content template 110. For example, the selected content generation service 114 generates the requested content based on data identifying the type of AI-generated content 116 (e.g., text or an image) to be input to an AI model implemented by the selected content generation service 114, data identifying the type of AI-generated content 116 (e.g., text or an image) to be output by the AI model implemented by the selected content generation service 114, or data describing other aspects of the AI-generated content 116 to be created, in various embodiments.

In an embodiment, the content templates 110 define default parameters for use by the selected content generation service 114 in generating the AI-generated content 116. In an embodiment, the request 108 for the AI-generated content 116 submitted to the interface (e.g., the API 104) exposed by the cognitive content service 102 includes one or more parameters that are used by the selected content generation service 114 to generate the AI-generated content 116 instead of the default parameters specified by the content template 110. The selected content generation service 114 utilizes the default parameters in the identified content template 110 to generate the AI-generated content 116 if the request 108 submitted to the cognitive content service 102 does not specify parameters, in an embodiment.

The selected content generation service 114 returns a response to the request received from the cognitive content service 102 that includes the AI-generated content 116, in an embodiment. The cognitive content service 102 receives the AI-generated content 116 and stores the AI-generated content 116 in an appropriate data store 118, in an embodiment.

In an embodiment, the response provided by the selected content generation service 114 also includes data identifying components utilized by the content generation service 114 to generate the AI-generated content 116. For instance, the response provided by the content generation service 114 to the cognitive content service 102 includes data (which may be referred to herein as "auditing data 122") identifying a model, or models, utilized to generate the AI-generated content 116, data identifying a version of the model, data describing a training history of the model, or data describing aspects of the infrastructure utilized by the content generation service 114 to execute the model, according to embodiments.

The cognitive content service 102 stores the auditing data 122 in an appropriate data store 124, in an embodiment. As will be described in greater detail below, the auditing data 122 can be utilized for governance, auditing, and potentially other purposes. Additional details regarding the collection and use of the auditing data 122 will be provided below with regard to FIG. 6.

As discussed briefly above, the cognitive content service 102 stores the AI-generated content 116 received from the content generation service 114 in an appropriate data store 118. The cognitive content service 102 also generates a response 120 to the request 108 for the AI-generated content 116.

In an embodiment, the response 120 to the request 108 for the AI-generated content 116 contains metadata 126 including an identifier for the AI-generated content 116 that can be used to retrieve the AI-generated content 116 from the cognitive content service 102. For instance, in an embodiment, the identifier is a URL that can be utilized to obtain the AI-generated content 116 from the interface (e.g., the API 104) exposed by the cognitive content service 102. Additional details regarding the mechanism shown in FIG. 1 for providing AI-generated content 116 will be provided below with regard to FIGS. 5, 7A, and 7B.

Figure 2:
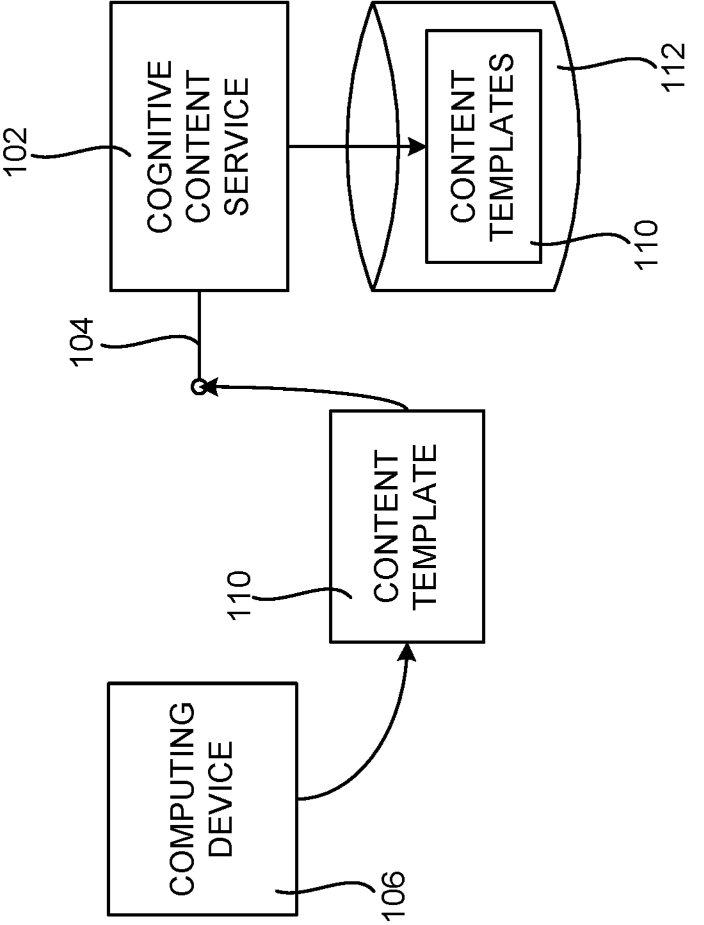
FIG. 2 is a computing system diagram illustrating aspects of a mechanism disclosed herein for creating and persisting content templates for use in providing AI-generated content, in an embodiment.

FIG. 2 is a computing system diagram showing additional aspects of the mechanism described briefly above with respect to FIG. 1 for creating and persisting content templates 110 for use in providing AI-generated content 116, in an embodiment. As discussed briefly above, a computing device 106 is utilized to create a content template 110, in an embodiment. As described briefly above, and in greater detail below with respect to FIG. 3, content templates 110 include data structures that define when requested AI-generated content 116 is to be generated. In an embodiment, the content templates 110 also include data structures that define how requested AI-generated content 116 is to be generated. In an embodiment, the content templates 110 are defined utilizing the Extensible Markup Language ("XML"). Other markup languages are utilized to define the content templates 110 in other embodiments.

As also discussed briefly above, the cognitive content service 102 exposes one or more interfaces for providing AI-generated content 116. For instance, in an embodiment, the cognitive content service 102 exposes a network services API 104 through which callers to the API 104, such as the computing device 106, can obtain AI-generated content 116, such as text, images, video, or audio. The cognitive content service 102 provides another type of interface, or interfaces, for requesting the AI-generated content 116, such as a GUI or CLI in another embodiment.

In an embodiment, the interface (e.g., the API 104), or interfaces, exposed by the cognitive content service 102 also provides functionality through which content templates 110 can be submitted to the cognitive content service 102 for storage, such as in an appropriate data store 112, and utilization in the manner described below. Details regarding the structure and content of an illustrative content template 110 will be provided below with respect to FIG. 3.

Figure 3:
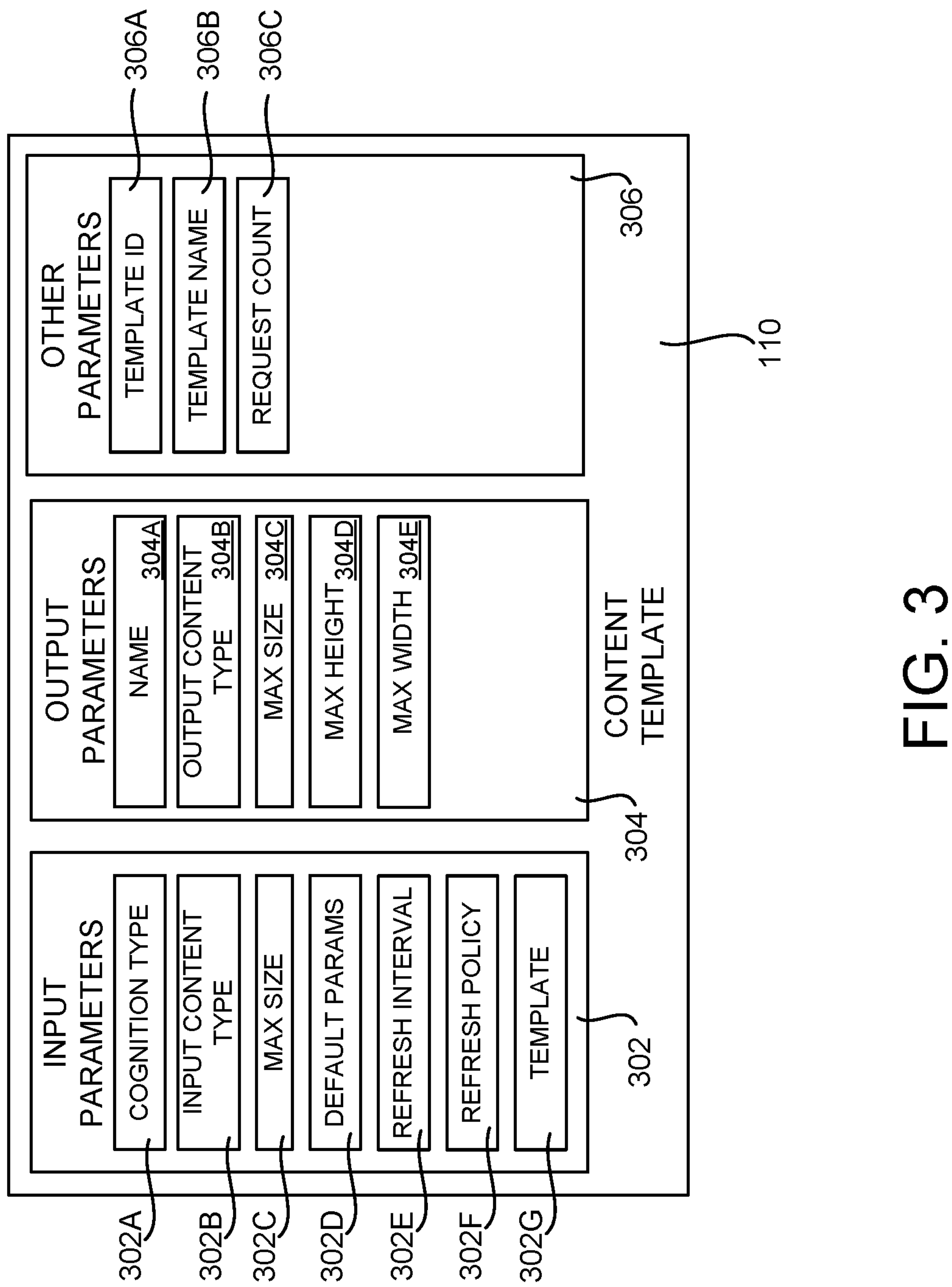
FIG. 3 is a data structure diagram illustrating aspects of the configuration of an illustrative content template utilized in providing AI-generated content, in an embodiment.

FIG. 3 is a data structure diagram showing aspects of the configuration of an illustrative content template 110 utilized in providing AI-generated content 116, in an embodiment. Table 1, below, sets forth an illustrative content template 110 that has been formatted according to the structure shown in FIG. 3. In this regard, it is to be appreciated that the structure and content of the illustrative content templates 110 shown in FIG. 3 and Table 1 are merely illustrative and that the content templates 110 may include additional or alternate content arranged in other ways in other embodiments.

In the embodiment shown in FIG. 3, the content template 110 includes input parameters 302, output parameters 304, and other parameters 306. In the illustrated embodiment, the input parameters 302 include input parameters 302A-302G, which will be described individually below.

The input parameter 302A specifies a cognition type, in an embodiment. As discussed briefly above, the specified cognition type defines the conditions under which new AI-generated content 116 is to be generated, or not generated, in response to a request 108 submitted to the interface (e.g., the API 104) exposed by the cognitive content service 102. As also discussed briefly above, the content templates 110 specify that cold, warm, or hot cognition is to be utilized, in an embodiment. The illustrative content template 110 set forth below in Table 1 specifies that cold cognition is to be utilized.

When the input parameter 302A of a content template 110 identified by a request 108 specifies that cold cognition is to be used, an identifier for an instance of previously generated AI-generated content 116 is returned in a response 120 to a request 108 for the AI-generated content 116, in an embodiment. When the input parameter 302A of a content template 110 identified by a request 108 specifies that hot cognition is to be used, new AI-generated content 116 is generated and returned in response to the request 108 for the AI-generated content 116, in an embodiment.

When the input parameter 302A of a content template 110 identified by a request 108 specifies that warm cognition is to be utilized, the cognitive content service 102 determines whether new AI-generated content 116 is to be generated based upon a refresh policy specified by the input parameter 302F, in an embodiment. As discussed briefly above, the refresh policy specified by the input parameter 302F defines conditions under which new AI-generated content 116 is to be generated, or not generated, in response to a request 108, in an embodiment.

In an embodiment, the refresh policy specifies the amount of time after which new AI-generated content 116 is to be generated in response to a request 108. In another embodiment, the refresh policy specifies the number of requests 108 for AI-generated content 116 after which a new instance of the AI-generated content 116 is to be generated. In this manner, a content template 110 can define policy indicating that new AI-generated content 116 is to be generated based on the content template 110 after a specified period has elapsed (e.g., five minutes or two hours) or after a number of requests 108 for the AI-generated content 116 have been received. The content template 110 includes other types of policies regarding the generation of AI-generated content 116 in a similar manner in other embodiments.

The input parameter 302E defines the refresh interval (e.g., the amount of time or number of requests) to be utilized when warm cognition is specified by the refresh policy set forth in input parameter 302F. Details regarding other aspects of cold, warm, and hot cognition were provided above with respect to FIG. 1. Additional details regarding these aspects will be provided below with regard to FIGS. 5, 7A, and 7B In an embodiment, the content template 110 includes an input parameter 302B that specifies the type of content that will be input to the AI model utilized by the selected content generation service 114. In an embodiment, for example, the input parameter 302B specifies that the input type will be text, image, video, audio, or another type of binary content. The illustrative content template 110 set forth below in Table 1 specifies that the input type is text content.

In an embodiment, the content template 110 includes an input parameter 302C that defines the maximum size of the input content. The illustrative content template 110 set forth below in Table 1 specifies that the maximum size of the input content is 10 kilobytes.

In an embodiment, the content template 110 includes an input parameter 302G that defines a template and an input parameter 302D that specifies default parameters for use in generating AI-generated content 116 based on the content template 110. In this embodiment, the template specified by the input parameter 302G describes aspects of the AI-generated content 116 to be generated. For instance, the template in the illustrative content template 110 set forth below in Table 1 specifies that the AI-generated content 116 is to be a "basket of { }." The brackets utilized in this embodiment provide the location at which either default parameters specified by the input parameter 302D or parameters received with a request 108 are to be inserted for use by the selected content generation service 114.

In the illustrated example, the default parameter specified by the input parameter 302D specifies that the text "oranges" is to be inserted into the template defined by the input parameter 302G if no parameters are received with a request 108. Consequently, in this example, the selected content generation service 114 would utilize the content template 110 to generate an image of a basket of oranges if no parameters are provided with the request 108.

In this example, parameters can be provided with the request 108 to cause images of baskets of other types of items to be generated based on the content template 110. For instance, a request 108 identifying the content template 110 set forth below in Table 1 might specify that the term "pears" is to be utilized in place of the default parameter "oranges" specified by the content template 110. In this example, the selected content generation service 114 would utilize the content template 110 to generate an image of a basket of pears.

TALBE 1

Illustrative Content Template

```
{
  "artifact_input": {
    "cognition_type": "cold",
    "content_type": "text",
    "max_size_kb": "10",
    "params": [
      "oranges"
    ],
    "refresh_interval": "−1",
    "refresh_policy": "request_count",
    "template": "basket of { }"
  },
  "artifact_output": {
    "content_blob": "1",
    "content_type": "image/jpeg",
    "max_size_kb": "15",
    "meta_resolution_height": "1024",
    "meta_resolution_width": "1024"
  },
  "id": "1",
  "name": "1",
"request_count": −1
}
```

As discussed briefly above, the illustrative content template 110 shown in FIG. 3 also includes output parameters 304. In the illustrated embodiment, the output parameters 304 include output parameters 304A-304G, which will be described individually below.

In the illustrated example, the output parameter 304A specifies a name for the output AI-generated content 116. The name for the AI-generated content 116 output by the selected content generation service 114 is expressed as a globally unique identifier ("GUID"), in an embodiment.

In the illustrated embodiment, the content template 110 includes an output parameter 304B that specifies the type of content that will be output by the AI model utilized by the selected content generation service 114. In an embodiment, for example, the output parameter 304B specifies that the output type will be text, image, video, audio, or another type of binary content. The illustrative content template 110 set forth above above in Table 1 specifies that the output type is a JPEG image.

In an embodiment, the content template 110 includes an output parameter 304C that defines the maximum size of the content that will be output by the AI model utilized by the selected content generation service 114. The illustrative content template 110 set forth above in Table 1 specifies that the maximum size of the output content is 15 kilobytes.

In an embodiment, the content template 110 includes output parameters 304D and 304E that define the maximum height and width of the content (e.g., for an image or video), respectively, that will be output by the AI model utilized by the selected content generation service 114. The illustrative content template 110 set forth above in Table 1 specifies that the maximum height of the output image is 1024 pixels and that the maximum width of the output image is 1024 pixels.

As discussed briefly above, the illustrative content template 110 shown in FIG. 3 also includes other parameters 306. In the illustrated embodiment, the other parameters 306 include other parameters 306A-306C, which will be described individually below.

In the illustrated embodiment, the other parameter 306A specifies a unique identifier, such as a GUID, that can be utilized to reference the content template 110. The other parameter 306B specifies a name of the content template 110 and the other parameter 306C specifies a value that is utilized to track the number of requests for the content template 110.

As indicated above, the structure and content of the example content template 110 shown in FIG. 3 is merely illustrative. The content templates 110 include additional or alternate parameters in other embodiments. For example, in embodiments, the content templates 110 include parameters specifying a preferred content generation service 114, a preference ranked ordering of content generation services 114, or a preferred AI model, or models, to be used to generate the AI-generated content 116. The cognitive content service 102 utilizes one or more of these parameters to select a content generation service 114 or a particular AI model in an embodiment. The cognitive content service 102 utilizes other data contained within or external to the content template 110 to select a content generation service 114 in another embodiment.

In an embodiment, a reference (e.g., a URL) to a content template 110 can be shared with users, network services, or other entities. Through this mechanism requests 108 can be submitted to the interface exposed by the cognitive content service 102 by third parties. In response to such requests 108, AI-generated content 116 can be provided in the manner described above without exposing the contents of the content templates 110 to the callers. In an embodiment, permissions can be assigned to the content templates 110 to specify those entities that have access to the functionality described herein. Permissions can be revoked to remove access to the disclosed functionality.

Figure 4:
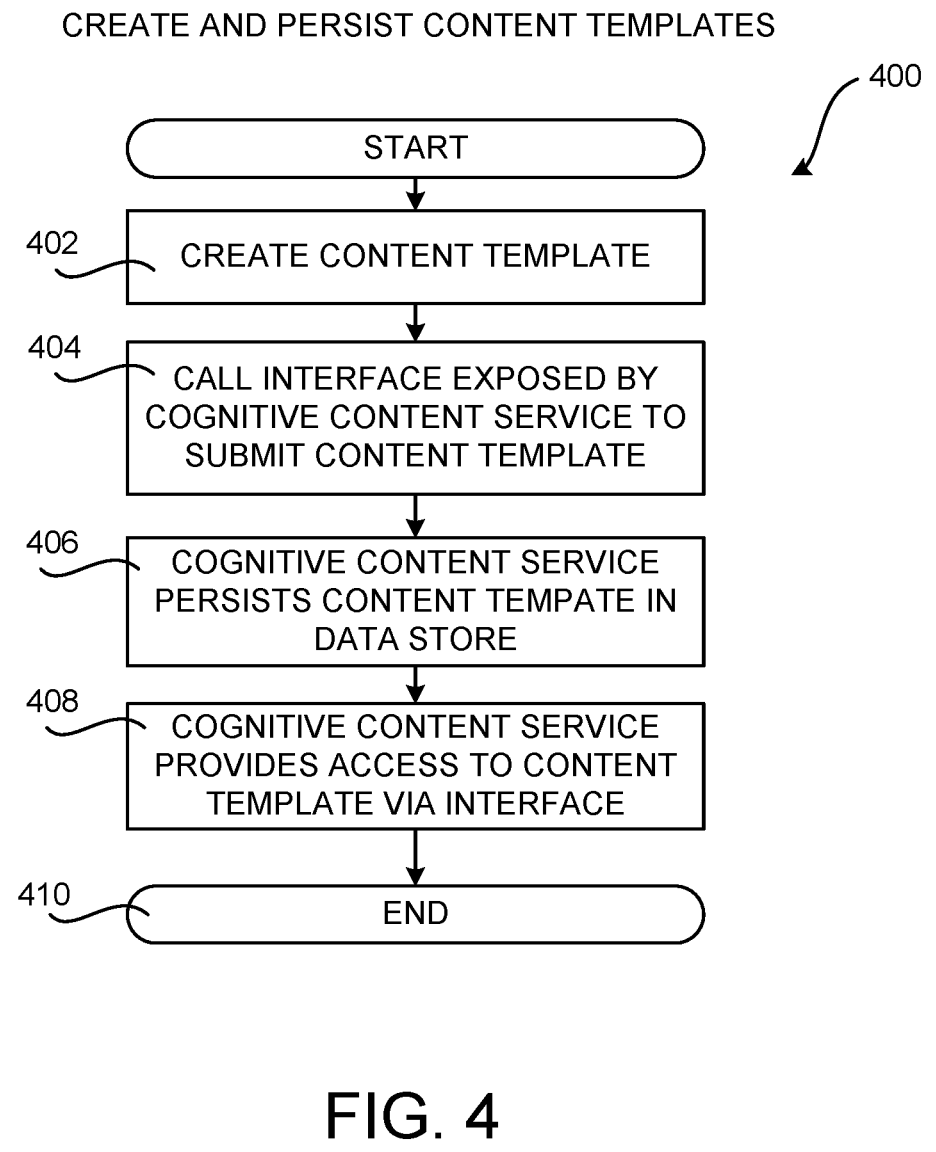

FIG. 4 is a flow diagram showing a routine 400 that illustrates aspects of the example mechanism shown in FIGS. 1-3 for creating and persisting content templates 110 for use in providing AI-generated content 116, in an embodiment. The routine 400 begins at operation 402, where a content template 110 is created in the manner described above with regard to FIG. 2. For instance, in the embodiment illustrated in FIG. 2, a computing device 106 is utilized to create a content template 110.

From operation 402, the routine 400 proceeds to operation 404, where the content template 110 created at operation 402 is submitted to the cognitive content service 102. For instance, in an embodiment, the computing device 106 submits the content template 110 to an interface, such as the API 104 or a GUI, exposed by the cognitive content service 102. The routine 400 then proceeds from operation 404 to operation 406.

At operation 406, the cognitive content service 102 persists the received content template 110 in an appropriate data store 112. The routine 400 then proceeds from operation 406 to operation 408, where the cognitive content service 102 provides access to the content template 110 via one or more interfaces, such as the API 104 or a GUI. Details regarding the processing of calls to such an interface are provided below with regard to FIGS. 5, 7A, and 7B. From operation 408, the routine 400 proceeds from to operation 410, where it ends.

Figure 5:
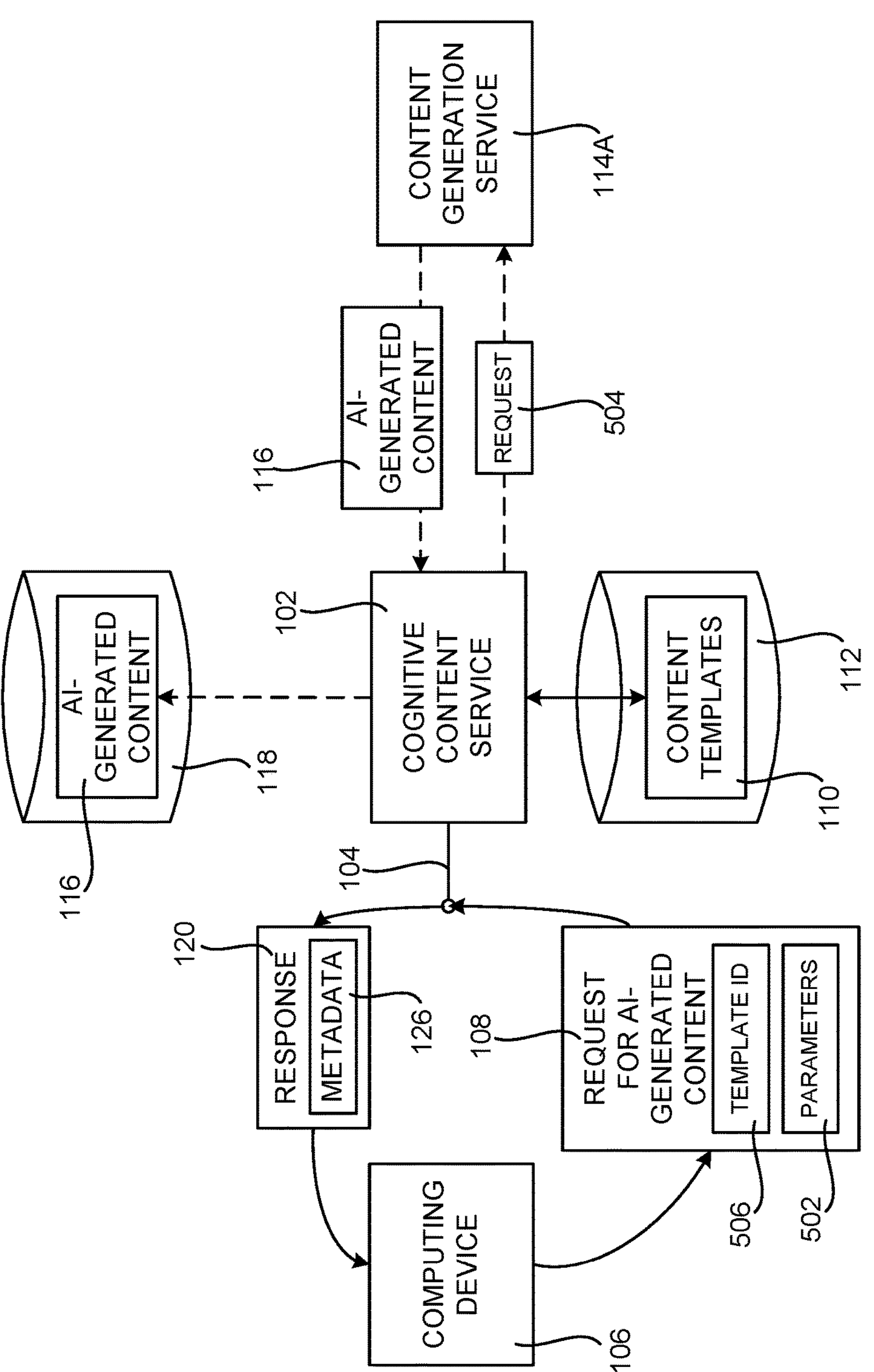
FIG. 5 is a computing system diagram illustrating aspects of an example mechanism for processing calls to an interface for providing AI-generated content, in an embodiment.

FIG. 5 is a computing system diagram showing additional aspects of the mechanism described above with regard to FIG. 1 for processing calls to an interface, such as the network services API 104, for providing AI-generated content 116, in an embodiment. As discussed briefly above, the cognitive content service 102 exposes one or more interfaces for providing AI-generated content 116. For instance, in an embodiment, the cognitive content service 102 exposes a network services API 104 through which callers to the API 104, such as the computing device 106, can obtain AI-generated content 116, such as text, images, video, or audio. The cognitive content service 102 provides another type of interface, or interfaces, for obtaining the AI-generated content 116, such as a GUI or CLI, in another embodiment.

As shown in FIG. 5, requests 108 for AI-generated content 116 made to the interface (e.g., the API 104) exposed by the cognitive content service 102 include an identifier 506 for a content template 110, in an embodiment. As discussed above with regard to FIG. 3, the content templates 110 include a parameter 306A that specifies a unique identifier for the content template 110, in an embodiment. The cognitive content service 102 utilizes the identifier 506 specified by the request 108 to identify the content template 110 that is to be utilized to satisfy a request 108.

As also shown in FIG. 5 and described briefly above, a request 108 to the interface exposed by the cognitive content service 102 includes one or more parameters 502, in an embodiment. As discussed above, when specified, the parameters 502 are used in place of any default parameters specified by the input parameter 302D in the content template 110.

As also discussed above, when a request 108 is received, the cognitive content service 102 utilizes the cognition type specified by input parameter 302F in the identified content template 110 to determine whether the requested AI-generated content 116 is to be newly generated or whether previously generated AI-generated content 116 stored in a data store 118 is to be returned in response to the request 108. If the cognitive content service 102 determines that the requested AI-generated content 116 is not to be generated, the cognitive content service 102 returns a response 120 to the request 108 that includes metadata 126 including an identifier for AI-generated content 116 that was previously generated (e.g., content generated in response to a previous request 108). Because new AI-generated content 116 is not created when cold cognition is utilized, requests for such content can be satisfied with very low latency and very low utilization of computing resources.

If the cognitive content service 102 determines that the requested AI-generated content 116 is to be newly generated, the cognitive content service 102 selects one of the content generation services 114A-114N to generate the requested AI-generated content 116, in an embodiment. As discussed above, the cognitive content service 102 selects a content generation service 114 to generate content in response to a specific request 108 based on data in the content template 110 identified by the request 108, in an embodiment. In the example shown in FIG. 5, the cognitive content service 102 has selected the content generation service 114A to satisfy the request 108.

As shown in FIG. 5, the cognitive content service 102 transmits a request 504 to the selected content generation service 114A to generate the AI-generated content 116 based on the content template 110, in an embodiment. The request

504 includes parameters from the content template 110 such as, for example, the input parameters 302 and the output parameters 304.

The selected content generation service 114A, in turn, generates the requested content and returns a response to the request 504 that includes the AI-generated content 116, in an embodiment. The cognitive content service 102 receives the AI-generated content 116 and stores the AI-generated content 116 in an appropriate data store 118, in an embodiment.

Figure 6:
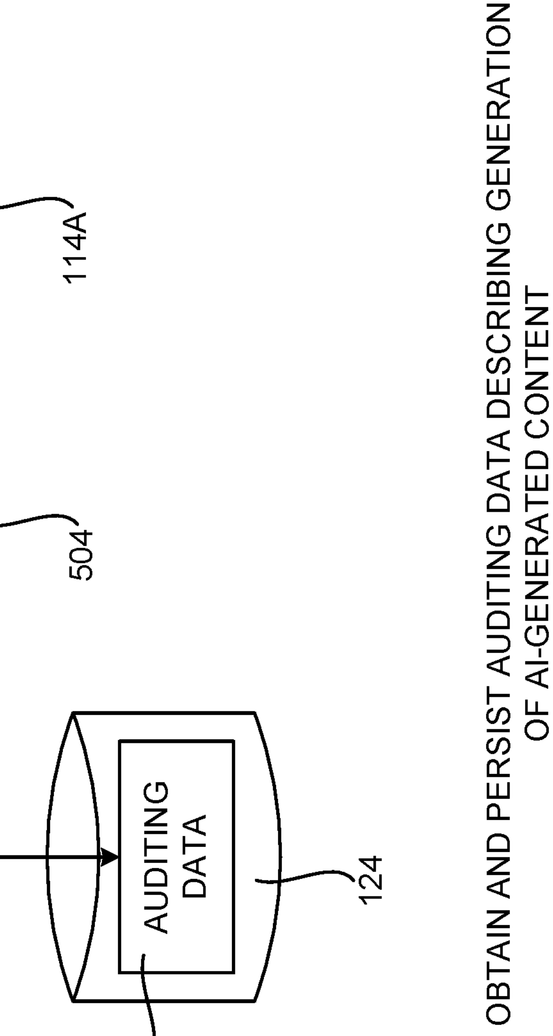
FIG. 6 is a computing system diagram illustrating aspects of an example mechanism for obtaining and persisting auditing data describing aspects of the generation of AI-generated content, in an embodiment.

As shown in FIG. 6 and described briefly above, the response provided by the selected content generation service 114 also includes auditing data 122, in an embodiment. The auditing data identifies components utilized by the content generation service 114 when generating the AI-generated content 116. For instance, the auditing data 122 includes data identifying a model, or models, utilized to generate the AI-generated content 116, data identifying a version of the model, data describing a training history of the model, or data describing the infrastructure utilized by the content generation service 114 to execute the model, according to embodiments.

The cognitive content service 102 stores the auditing data 122 in an appropriate data store 124, in an embodiment. As will be described in greater detail below, the auditing data 122 can be utilized for governance, auditing, and potentially other purposes.

As discussed briefly above, the cognitive content service 102 stores the AI-generated content 116 received from the content generation service 114A in an appropriate data store 118. The cognitive content service 102 also generates a response 120 to the request 108 for the AI-generated content 116.

In an embodiment, the response 120 to the request 108 for the AI-generated content 116 contains metadata 126 including an identifier for the AI-generated content 116 that can be used to retrieve the AI-generated content 116 from the cognitive content service 102. In an embodiment, the identifier is a URL that can be utilized to obtain the AI-generated content 116 from the interface (e.g., the API 104) exposed by the cognitive content service 102.

The response 120 to the request 108 for the AI-generated content 116 contains other types of data in other embodiments. For example, in an embodiment the response 120 includes a reference (e.g., a hyperlink) to a dashboard that presents a history of requests 108 made to the interface exposed by the cognitive content service 102 and responses 120 to the requests 108. The response 120 includes other types of data in other embodiments.

Figure 7A:
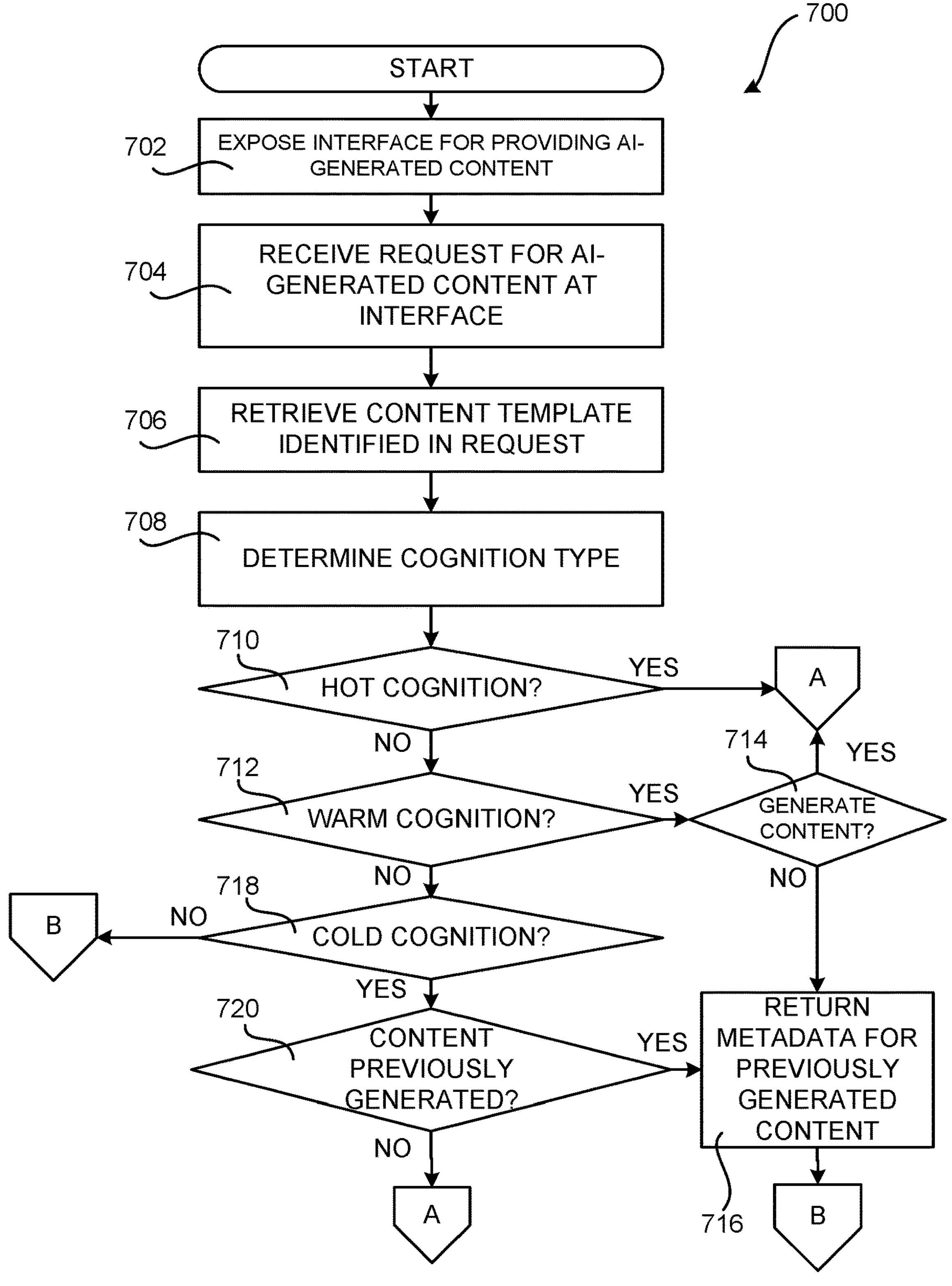
FIG. 7A is a flow diagram showing a routine that illustrates aspects of the example mechanism shown in FIGS. 5 and 6 for processing calls to an interface for providing AI-generated content, in an embodiment.
Figure 7B:
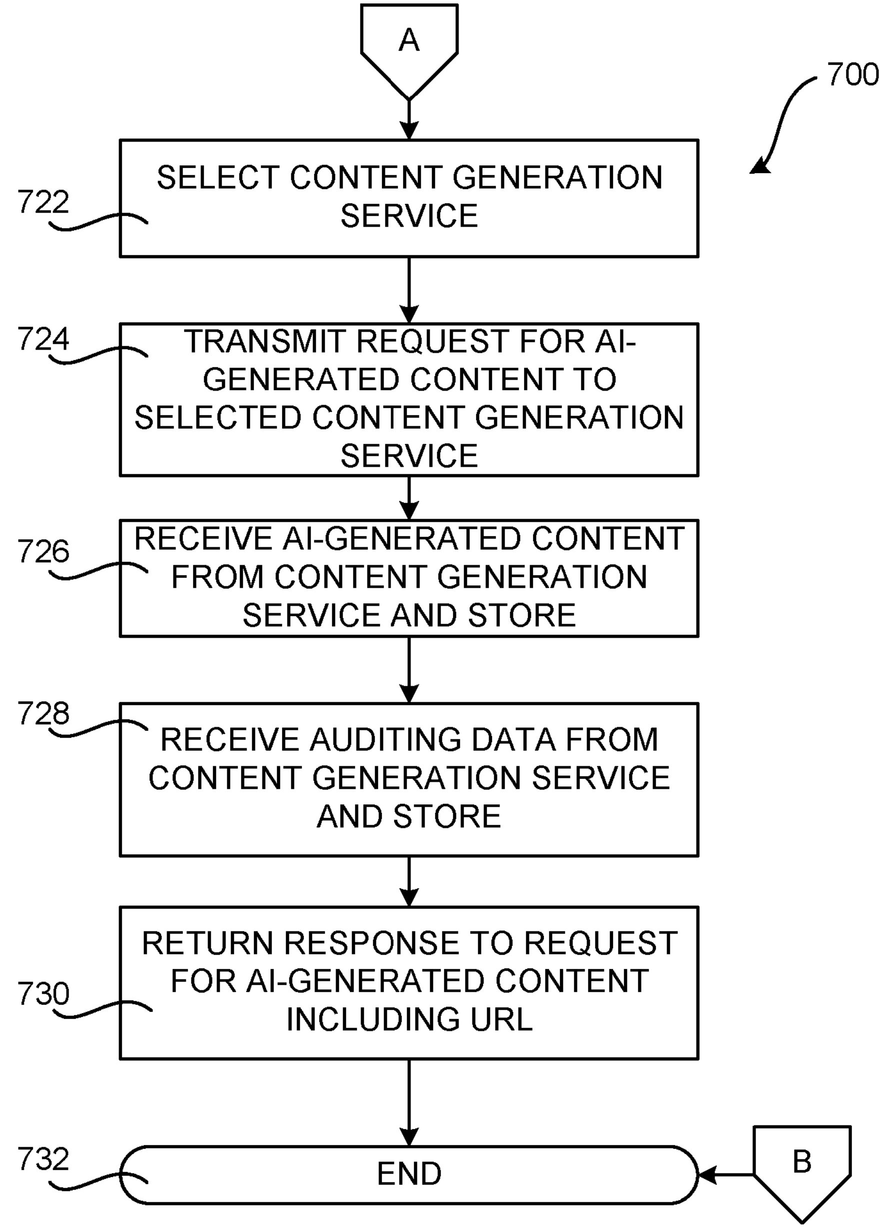
FIG. 7B is a flow diagram showing the continuation of the routine of FIG. 7A that illustrates additional aspects of the example mechanism shown in FIGS. 5 and 6 for processing calls to an interface for providing AI-generated content, in an embodiment.

FIGS. 7A and 7B are flow diagrams showing a routine 700 that illustrates aspects of the example mechanism shown in FIGS. 5 and 6 for processing calls to an interface, such as the network services API 104, for providing AI-generated content 116, in an embodiment. The routine 700 begins at operation 702, where the cognitive content service 102 exposes an interface for providing AI-generated content 116. As discussed above, the interface can be a network services API 104, a GUI, a CLI, or another type of computer-implemented interface, in various embodiments.

From operation 702, the routine 700 proceeds to operation 704, where the cognitive content service 102 receives a request for AI-generated content 116 at the interface exposed at operation 702. As discussed above with regard to FIG. 5, the request 108 includes an identifier 506 for a content template 110 and one or more parameters 502, in an embodiment.

From operation 704, the routine 700 proceeds to operation 706, where the cognitive content service 102 retrieves the content template 110 identified by the request 108. The routine 700 then proceeds from operation 706 to operation 708, where the cognitive content service 102 determines the cognition type for the request 108 received at operation 704. As discussed above, the cognition type (e.g., cold, warm, or hot) is specified by the input parameter 302A in the content template 110, in an embodiment.

From operation 708, the routine 700 proceeds to operation 710, where the cognitive content service 102 determines if the input parameter 302A indicates that hot cognition is to be utilized. If the cognitive content service 102 determines that hot cognition is to be utilized, the routine 700 proceeds from operation 710 to operation 722, which is shown in FIG. 7B and described below.

If, at operation 710, the cognitive content service 102 determines that hot cognition is not to be utilized to satisfy the request 108, the routine 700 proceeds from operation 710 to operation 712. At operation 712, the cognitive content service 102 determines if warm cognition is to be utilized to satisfy the request 108.

If, at operation 712, the cognitive content service 102 determines that warm cognition is to be utilized, the routine 700 proceeds from operation 712 to operation 714. At operation 714, the cognitive content service 102 determines, based upon the refresh policy set forth by the input parameter 302F and the input parameter 302E, where new AI-generated content 116 is to be generated. If the cognitive content service 102 determines that new AI-generated content 116 is to be generated, the routine 700 proceeds from operation 714 to operation 722, which is shown in FIG. 7B and described below.

If, at operation 714, the cognitive content service 102 determines that new AI-generated content 116 is not to be generated, the routine 700 proceeds from operation 714 to operation 716. At operation 716, metadata 126 identifying previously generated AI-generated content 116 is returned in a response 120 to the request 108. The routine 700 then proceeds from operation 716 to operation 732, where it ends.

If, at operation 712, the cognitive content service 102 determines that warm cognition is not to be utilized, the routine 700 proceeds from operation 712 to operation 718. At operation 718, the cognitive content service 102 determines if cold cognition is to be utilized to satisfy the request 108. If cold cognition is not to be utilized, the routine 700 then proceeds from operation 718 to operation 732, where it ends. In this case, an error message might be returned in response to the request 108 indicating that the request 108 did not specify a valid cognition type.

If, at operation 718, the cognitive content service 102 determines that cold cognition is to be utilized, the routine 700 proceeds from operation 718 to operation 720. At operation 720, the cognitive content service 102 determines if the requested AI-generated content 116 was previously generated and stored in the data store 118 or in another location.

If the requested AI-generated content 116 was previously generated and stored, the routine 700 proceeds from operation 720 to operation 716, where metadata 126 identifying the previously generated AI-generated content 116 is returned in a response 120 to the request 108. The routine 700 then proceeds from operation 716 to operation 732, where it ends. However, if the requested AI-generated content 116 was not previously generated and stored, the routine 700 proceeds from operation 720 to operation 722.

At operation 722, the cognitive content service 102 selects a content generation service 114 in the manner described above. The routine 700 then proceeds from operation 722 to operation 724, where the cognitive content service 102 transmits a request 504 to generate the AI-generated content 116 to the selected content generation service 114. The selected content generation service 114, in turn, generates the requested AI-generated content 116 in the manner described above.

From operation 724, the routine 700 proceeds to operation 726, where the cognitive content service 102 receives the AI-generated content 116 from the content generation service 114 and stores the AI-generated content 116 in the data store 118, in an embodiment. At operation 728, the cognitive content service 102 receives auditing data 122 associated with the received AI-generated content 116 and stores the auditing data 122 in the data store 124, in an embodiment.

From operation 728, the routine 700 proceeds to operation 730, where the cognitive content service 102 returns a response 120 to the request 108 that includes metadata 126. As discussed above, the metadata 126 includes an identifier for the AI-generated content 116 that can be used to retrieve the AI-generated content 116 from the cognitive content service 102, in an embodiment. For instance, in an embodiment, the identifier is a URL that can be utilized to obtain the AI-generated content 116 from the interface (e.g., the API 104) exposed by the cognitive content service 102. From operation 730, the routine 700 proceeds to operation 732, where it ends.

Figure 8:
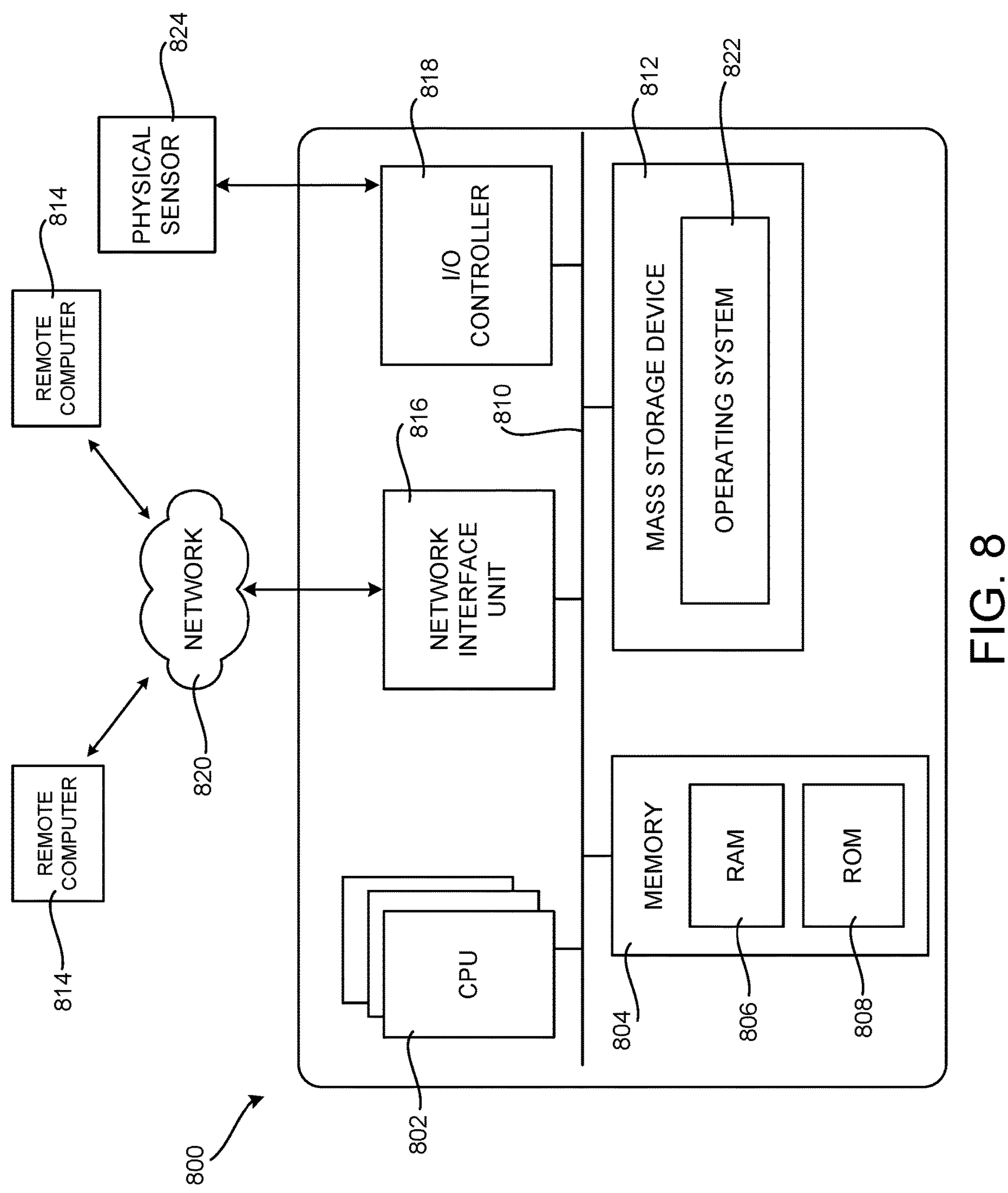
FIG. 8 is a computer architecture diagram showing an illustrative computer hardware and software architecture for a processing system that implements aspects of the technologies presented herein in an embodiment.

FIG. 8 is a computer architecture diagram showing an illustrative computer hardware and software architecture for a processing system 800 that implements the various technologies presented herein, in an embodiment. In particular, the architecture illustrated in FIG. 8 is utilized to implement aspects of a computing system capable of executing the cognitive content service 102 for providing aspects of the functionality disclosed herein, in an embodiment. The architecture illustrated in FIG. 8 is also utilized to implement aspects of a computing system capable of implementing a content generation service 114, in an embodiment.

The processing system 800 illustrated in FIG. 8 includes a central processing unit 802 ("CPU"), a system memory 804, including a random-access memory 806 ("RAM") and a read-only memory ("ROM") 808, and a system bus 810 that couples the system memory 804 to the CPU 802, in an embodiment. A firmware (not shown in FIG. 8) containing the basic routines that help to transfer information between elements within the processing system 800, such as during startup, is stored in the ROM 808 in an embodiment.

The processing system 800 further includes a mass storage device 812 in an embodiment for storing an operating system 822, application programs, and other types of programs, some of which have been described herein. The mass storage device 812 is also configured to store other types of programs and data, in an embodiment.

The mass storage device 812 is connected to the CPU 802 through a mass storage controller (not shown in FIG. 8) connected to the bus 810, in an embodiment. The mass storage device 812 and its associated computer readable media provide non-volatile storage for the processing system 800. Although the description of computer readable media contained herein refers to a mass storage device, such as a hard disk, Compact Disk Read-Only Memory ("CD-ROM") drive, Digital Versatile Disc-Read Only Memory ("DVD-ROM") drive, or Universal Serial Bus ("USB") storage key, computer readable media is any available computer-readable storage media or communication media that is accessible by the processing system 800.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, communication media includes wired media such as a wired network or direct-wired connection, and wireless media such as acoustic, radio frequency, infrared and other wireless media. Combinations of the any of the above are also included within the scope of computer-readable media.

By way of example, computer-readable storage media includes volatile and non-volatile, removable and non-removable media implemented in any method or technology for storage of information such as computer readable instructions, data structures, program modules or other data, in an embodiment. For example, computer-readable storage media includes RAM, ROM, erasable programmable ROM ("EPROM"), electrically EPROM ("EEPROM"), flash memory or other solid-state memory technology, CD-ROM, DVD-ROM, HD-DVD, BLU-RAY®, or other optical storage, magnetic cassettes, magnetic tape, magnetic disk storage or other magnetic storage devices, or any other medium that stores the desired information and which is accessible to the processing system 800. For purposes of the claims, the phrase "computer-readable storage medium," and variations thereof, does not include waves or signals per se or communication media.

According to various configurations, the processing system 800 operates in a networked environment using logical connections to remote computers 814 through a network such as the network 820. The processing system 800 connects to the network 820 through a network interface unit 816 connected to the bus 810, in an embodiment. The network interface unit 816 is utilized to connect to other types of networks and remote computer systems, in embodiments.

The processing system 800 also includes an input/output controller 818 for receiving and processing input from a number of other devices, including a keyboard, mouse, touch input, an electronic stylus (none of which are shown in FIG. 8), or a physical sensor 824, such as a video camera, in an embodiment. Similarly, the input/output controller 818 provides output to a display screen or other type of output device (also not shown in FIG. 8), in an embodiment.

The software components described herein, when loaded into the CPU 802 and executed, transform the CPU 802 and the overall processing system 800 from a general-purpose computing device into a special-purpose processing system customized to facilitate the functionality presented herein. The CPU 802 is constructed from transistors or other discrete circuit elements, which individually or collectively assume any number of states, in an embodiment.

More specifically, the CPU 802 operates as a finite-state machine, in response to executable instructions contained within the software modules disclosed herein, in an embodiment. These computer-executable instructions transform the CPU 802 by specifying how the CPU 802 transitions between states, thereby transforming the transistors or other discrete hardware elements constituting the CPU 802.

Encoding the software modules presented herein also transforms the physical structure of the computer readable media presented herein, in an embodiment. The specific transformation of physical structure depends on various factors, in different implementations of this description. Examples of such factors include, the technology used to implement the computer readable media, whether the computer readable media is characterized as primary or secondary storage, and the like.

For example, if the computer readable media is implemented as semiconductor-based memory, the software disclosed herein is encoded on the computer readable media by transforming the physical state of the semiconductor memory, in an embodiment. For instance, the software transforms the state of transistors, capacitors, or other discrete circuit elements constituting the semiconductor memory, in an embodiment. The software transforms the physical state of such components in order to store data thereupon, in an embodiment.

As another example, the computer readable media disclosed herein is implemented using magnetic or optical technology, in an embodiment. In such implementations, the program components presented herein transform the physical state of magnetic or optical media, when the software is encoded therein. These transformations include altering the magnetic characteristics of particular locations within given magnetic media, in an embodiment. These transformations also include altering the physical features or characteristics of particular locations within given optical media, to change the optical characteristics of those locations, in an embodiment. Other transformations of physical media are possible without departing from the scope and spirit of the present description, with the foregoing examples provided only to facilitate this discussion.

It is to be appreciated that the architecture shown in FIG. 8 for the processing system 800, or a similar architecture, is suitable for implementing other types of computing devices, including hand-held computers, video game devices, embedded computer systems, mobile devices such as smartphones, tablets, alternate reality ("AR"), mixed reality ("MR"), and virtual reality ("VR") devices, and other types of computing devices known to those skilled in the art. It is also contemplated that the processing system 800 might not include all of the components shown in FIG. 8, include other components that are not explicitly shown in FIG. 8, or an utilize an architecture completely different than that shown in FIG. 8, according to embodiments.

Figure 9:
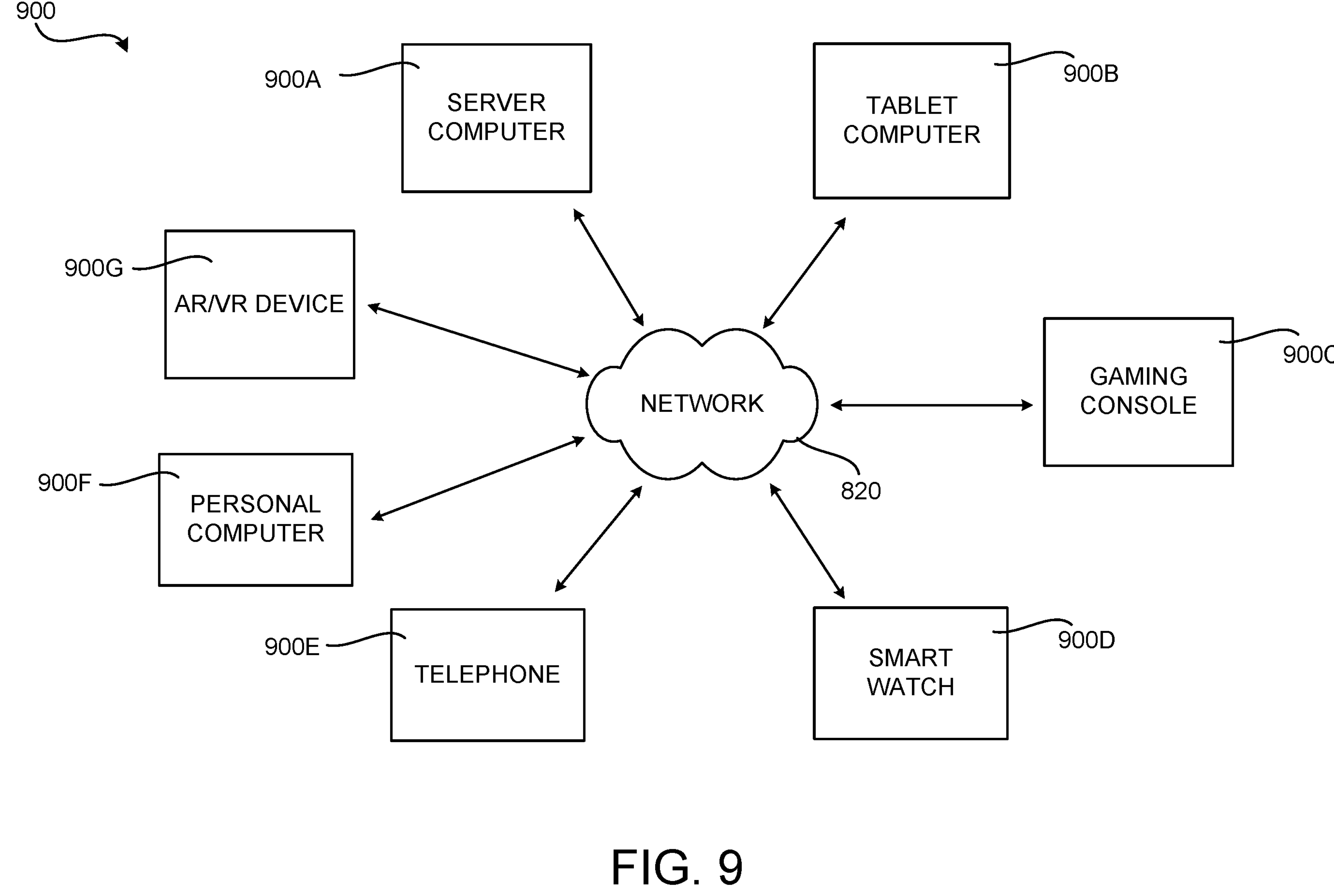
FIG. 9 is a network diagram illustrating an example distributed computing environment in which aspects of the disclosed technologies are implemented in an embodiment.

FIG. 9 is a network diagram illustrating a distributed network computing environment 900 in which aspects of the disclosed technologies are implemented, according to various embodiments presented herein. As shown in FIG. 9, one or more server computers 900A are interconnected via a network 820 (which might be either of, or a combination of, a fixed-wire or wireless local area network ("WLAN"), wide-area network ("WAN"), intranet, extranet, peer-to-peer network, a virtual private network ("VPN"), the internet, Bluetooth® communication network, proprietary low voltage communication network, or other communication network) with a number of client computing devices such as a tablet computer 900B, a gaming console 900C, a smart watch 900D, a telephone 900E, such as a smartphone, a personal computer 900F, and an AR/VR device 900G.

In a network environment in which the network 820 is the internet, for example, the server computer 900A is a dedicated server computer operable to process and communicate data to and from the client computing devices 900B-900G via any of a number of known protocols, such as, hypertext transfer protocol ("HTTP"), file transfer protocol ("FTP"), or simple object access protocol ("SOAP").

Additionally, the network computing environment 900 utilizes various data security protocols such as secured socket layer ("SSL") or pretty good privacy ("PGP"), in an embodiment. Each of the client computing devices 900B-900G is equipped with an operating system ("OS"), such as the OS 822, operable to support one or more computing applications or terminal sessions such as a web browser (not shown in FIG. 9), graphical UI (not shown in FIG. 9), or a mobile desktop environment (not shown in FIG. 9) to gain access to the server computer 900A, in an embodiment.

The server computer 900A is communicatively coupled to other computing environments (not shown in FIG. 9) and receives data regarding a participating user's interactions, in an embodiment. In an illustrative operation, a user (not shown in FIG. 9) interacts with a computing application running on a client computing device 900B-900G to obtain desired data and/or perform other computing applications.

The data and/or computing applications are stored on the server computer 900A, or server computers 900A, and communicated to cooperating users through the client computing devices 900B-900G over the network 820, in an embodiment. A participating user (not shown in FIG. 9) requests access to specific data and applications housed in whole or in part on the server computer 900A. These data are communicated between the client computing devices 900B-900G and the server computer 900A for processing and storage, in an embodiment.

The server computer 900A hosts computing applications, processes and applets for the generation, authentication, encryption, and communication of data and applications such as those described above with regard to FIGS. 1-7B, and cooperates with other server computing environments (not shown in FIG. 9), third party service providers (not shown in FIG. 9), and network attached storage ("NAS") and storage area networks ("SAN") (also not shown in FIG. 9) to realize application/data transactions, in an embodiment.

The computing architecture shown in FIG. 8 and the distributed network computing environment shown in FIG. 9 have been simplified for ease of discussion. The computing architecture and the distributed computing network include and utilize many more computing components, devices, software programs, networking devices, and other components not specifically described herein, in an embodiment. Those skilled in the art will also appreciate that the subject matter described herein can be practiced with other computer system configurations other than those shown in FIGS. 8 and 9, including hand-held devices, multiprocessor systems, microprocessor-based or programmable consumer electronics, computing or processing systems embedded in devices (such as wearable computing devices, automobiles, home automation, etc.), minicomputers, mainframe computers, and the like.

It is to be further understood that the operations of the routines and methods disclosed herein are not presented in any particular order and that performance of some or all of the operations in an alternative order, or orders, is possible and is contemplated. The operations have been presented in the demonstrated order for ease of description and illustration. Operations might be added, omitted, and/or performed simultaneously, without departing from the scope of the appended claims. The illustrated routines and methods might end at any time and need not be performed in their entireties.

Some or all operations of the methods, and/or substantially equivalent operations, are performed by execution of computer-readable instructions included on a computer-readable storage media, as defined herein, in an embodiment. The term "computer-readable instructions," and variants thereof, as used herein, is used expansively herein to include routines, applications, application modules, program modules, programs, program components, data structures, algorithms, and the like. Computer-readable instructions are implemented on various system configurations, including single-processor or multiprocessor systems, minicomputers, mainframe computers, personal computers, hand-held computing devices, microprocessor-based, programmable consumer electronics, combinations thereof, and the like.

The logical operations described herein are implemented (1) as a sequence of computer implemented acts or program modules running on a computing system and/or (2) as interconnected machine logic circuits or circuit modules within the computing system, according to an embodiment. The implementation is a matter of choice dependent on the performance and other requirements of the computing system. Accordingly, the logical operations described herein are referred to variously as states, operations, structural devices, acts, or modules. These operations, structural devices, acts, and modules are implemented in software, in firmware, in special purpose digital logic, and any combination thereof, according to embodiments.

For example, the operations illustrated in the sequence and flow diagrams and described herein are implemented in embodiments, at least in part, by modules implementing the features disclosed herein such as a dynamically linked library ("DLL"), a statically linked library, functionality provided by an API such as the API 104, a network service, a compiled program, an interpreted program, a script or any other executable set of instructions. Data is stored in a data structure in one or more memory components, in an embodiment. Data is retrieved from the data structure by addressing links or references to the data structure, in an embodiment.

The methods and routines described herein might be also implemented in many other ways. For example, the routines and methods are implemented, at least in part, by a processor of another remote computer or a local circuit, in an embodiment. In addition, one or more of the operations of the routines or methods are alternatively or additionally implemented, at least in part, by a chipset working alone or in conjunction with other software modules, in an embodiment.

The disclosure presented herein also encompasses the subject matter set forth in the following clauses:

Clause 1. A computer-implemented method, comprising: exposing a network services application programming interface (API); receiving a request for artificial intelligence (AI)-generated content at the network services API, the request comprising an identifier for a content template; determining, based on the content template, whether the AI-generated content is to be generated: responsive to determining that the AI-generated content is to be generated, causing a content generation service to generate the AI-generated content based on the content template; and returning a response to the request comprising an identifier for the AI-generated content.

Clause 2. The computer-implemented method of clause 1, wherein determining, based on the content template, whether the AI-generated content is to be generated comprises: determining a cognition type based upon the content template, the cognition type comprising one of cold cognition, warm cognition, or hot cognition; and responsive to determining that the cognition type is hot cognition, determining that the AI-generated content is to be generated.

Clause 3. The computer-implemented method of any of clauses 1 or 2, wherein determining, based on the content template, whether the AI-generated content is to be generated comprises: determining a cognition type based upon the content template, the cognition type comprising one of cold cognition, warm cognition, or hot cognition: and responsive to determining that the cognition type is warm cognition, determining whether the AI-generated content is to be generated based upon a refresh policy defined by the content template, the refresh policy specifying the amount of time after which new AI-generated content is to be generated in response to a request.

Clause 4. The computer-implemented method of any of clauses 1-3, wherein the content template includes one or more default parameters for use by the content generation service in generating the AI-generated content, wherein the request for the AI-generated content comprises one or more parameters, and wherein the parameters in the request for the AI-generated content are used to generate the AI-generated content instead of the one or more default parameters.

Clause 5. The computer-implemented method of any of clauses 1-4, further comprising: responsive to determining that the AI-generated content is to be generated, selecting the content generation service from a plurality of content generation services based on the content template.

Clause 6. The computer-implemented method of any of clauses 1-5, wherein the response to the request further comprises data identifying one or more components utilized by the content generation service to generate the AI-generated content.

Clause 7. The computer-implemented method of any of clause 6, wherein the data identifying the one or more components utilized by the content generation service to generate the AI-generated content comprises one or more of data identifying a model utilized to generate the AI-generated content, data identifying a version of the model, data describing a training history of the model, or data identifying infrastructure utilized to execute the model.

Clause 8. A computer-readable storage medium having computer-executable instructions stored thereupon which, when executed by a processing system, cause the processing system to: receive a request for artificial intelligence (AI)-generated content, the request identifying a content template; determine, based on the identified content template, whether the AI-generated content is to be generated or whether previously generated AI-generated content is to be returned in response to the request: responsive to determining that the AI-generated content is to be generated, cause a content generation service to generate the AI-generated content based on the content template: and return a response to the request, the response comprising an identifier for the AI-generated content.

Clause 9. The computer-readable storage medium of clause 8, having further computer-executable instructions stored thereupon to: responsive to determining that the previously generated AI-generated content is to be returned in response to the request, return a response to the request comprising an identifier for the previously generated AI-generated content.

Clause 10. The computer-readable storage medium of any of clauses 8 or 9, wherein determining, based on the identified content template, whether the AI-generated content is to be generated or whether previously generated AI-generated content is to be returned in response to the request comprises determining whether the AI-generated content is to be generated based upon a refresh policy defined by the content template, the refresh policy specifying the amount of time after which new AI-generated content is to be generated in response to a request.

Clause 11. The computer-readable storage medium of any of clauses 8-10, wherein the content template includes one or more default parameters for use by the content generation service in generating the AI-generated content, wherein the request for the AI-generated content comprises one or more parameters, and wherein the parameters in the request for the AI-generated content are used to generate the AI-generated content instead of the one or more default parameters.

Clause 12. The computer-readable storage medium of any of clauses 8-11, having further computer-executable instructions stored thereupon to select the content generation service from a plurality of content generation services based on the content template.

Clause 13. The computer-readable storage medium of any of clauses 8-12, wherein the response to the request further comprises data identifying one or more components utilized by the content generation service to generate the AI-generated content.

Clause 14. The computer-readable storage medium of any of clauses 8-13, wherein the data identifying the one or more components utilized by the content generation service to generate the AI-generated content comprises one or more of data identifying a model utilized to generate the AI-generated content, data identifying a version of the model, data describing a training history of the model, or data identifying infrastructure utilized to execute the model.

Clause 15. A processing system, comprising: a processor; and a computer-readable storage medium having computer-executable instructions stored thereupon that, when executed by the processing system, cause the processing system to: receive a request for artificial intelligence (AI)-generated content, the request identifying a content template: determine, based on the identified content template, whether the AI-generated content is to be generated or whether previously generated AI-generated content is to be returned in response to the request: responsive to determining that the AI-generated content is to be generated, cause a content generation service to generate the AI-generated content based on the content template; and return a response to the request, the response comprising an identifier for the AI-generated content.

Clause 16. The processing system of clause 15, wherein the computer-readable storage medium has further computer-executable instructions stored thereupon to: responsive to determining that the previously generated AI-generated content is to be returned in response to the request, return a response to the request comprising an identifier for the previously generated AI-generated content.

Clause 17. The processing system of any of clauses 15 or 16, wherein determining, based on the identified content template, whether the AI-generated content is to be generated or whether previously generated AI-generated content is to be returned in response to the request comprises determining whether the AI-generated content is to be generated based upon a refresh policy defined by the content template, the refresh policy specifying the amount of time after which new AI-generated content is to be generated in response to a request.

Clause 18. The processing system of any of clauses 15-17, wherein parameters defined by the request for the AI-generated content are used to generate the AI-generated content in place of one or more default parameters in the content template.

Clause 19. The processing system of any of clauses 15-18, wherein the content generation service is selected from a plurality of content generation services based on the content template.

Clause 20. The processing system of any of clauses 15-19, wherein the response further comprises one or more of data identifying a model utilized to generate the AI-generated content, data identifying a version of the model, data describing a training history of the model, or data identifying infrastructure components utilized to execute the model.

Technologies for providing AI-generated content have been disclosed herein. Although the subject matter presented herein has been described in language specific to computer structural features, methodological and transformative acts, specific computing machinery, and computer readable media, it is to be understood that the subject matter set forth in the appended claims is not limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes might be made to the subject matter described herein without following the example configurations and applications illustrated and described, and without departing from the scope of the present disclosure, which is set forth in the following claims.

What is claimed is:

1. A computer-implemented method, comprising:

exposing a network services application programming interface (API);

receiving a request for artificial intelligence (AI)-generated content at the network services API, the request comprising an identifier for a content template generated prior to the request, wherein the content template comprises structured data indicating a cognition type and a refresh policy;

retrieving the content template identified by the request from a data store comprising multiple different content templates, wherein the multiple different content templates include at least one content template specifying cold cognition, at least one content template specifying warm cognition, and at least one content template specifying hot cognition;

determining, based on the cognition type indicated in the content template, whether new AI-generated content is to be generated or whether previously generated AI-generated content is to be returned in response to the request, wherein the cognition type is one of:

cold cognition specifying that the previously generated AI-generated content is to be returned, warm cognition specifying that a determination of whether to generate the new AI-generated content is based upon the refresh policy, or hot cognition indicating that the new AI-generated content is to be generated;

responsive to determining that the new AI-generated content is to be generated, causing a content generation service to generate the new AI-generated content based on the content template; and returning a response to the request comprising an identifier for the new AI-generated content.

2. The computer-implemented method of claim 1, wherein the cognition type is hot cognition and new AI-generated content is to be generated.

3. The computer-implemented method of claim 1, wherein the cognition type is warm cognition, and the refresh policy specifies the amount of time after which the new AI-generated content is to be generated in response to a request.

4. The computer-implemented method of claim 1, wherein the content template includes one or more default parameters for use by the content generation service in generating the new AI-generated content, wherein the request for the AI-generated content comprises one or more parameters, and wherein the parameters in the request for the AI-generated content are used to generate the new AI-generated content instead of the one or more default parameters.

5. The computer-implemented method of claim 1, wherein the content template comprises structured data indicating the content generating service to be used to generate the new AI-generated content and further comprising:

responsive to determining that the new AI-generated content is to be generated, selecting the content generation service from a plurality of content generation services based on the content template.

6. The computer-implemented method of claim 1, wherein the response to the request further comprises data identifying one or more components utilized by the content generation service to generate the new AI-generated content.

7. The computer-implemented method of claim 6, wherein the data identifying the one or more components utilized by the content generation service to generate the new AI-generated content comprises one or more of data identifying a model utilized to generate the new AI-generated content, data identifying a version of the model, data describing a training history of the model, or data identifying infrastructure utilized to execute the model.

8. A computer-readable storage medium having computer-executable instructions stored thereupon which, when executed by a processing system, cause the processing system to:

receive a request for artificial intelligence (AI)-generated content, the request identifying a content template generated prior to the request, wherein the content template comprises structured data indicating a cognition type and a refresh policy;

retrieve the content template identified by the request from a data store comprising multiple different content templates, wherein the multiple different content templates include at least one content template specifying cold cognition, at least one content template specifying warm cognition, and at least one content template specifying hot cognition;

determine, based on the cognition type indicated in the content template, whether new AI-generated content is to be generated or whether previously generated AI-generated content is to be returned in response to the request, wherein the cognition type is one of:

cold cognition specifying that the previously generated AI-generated content is to be returned, warm cognition specifying that a determination of whether to generate the new AI-generated content is based upon the refresh policy, or hot cognition indicating that the new AI-generated content is to be generated;

responsive to determining that the new AI-generated content is to be generated, cause a content generation service to generate the new AI-generated content based on the content template; and return a response to the request, the response comprising an identifier for the new AI-generated content.

9. The computer-readable storage medium of claim 8, wherein the cognition type is warm cognition, the refresh policy specifies the amount of time after which the new AI-generated content is to be generated in response to a request.

10. The computer-readable storage medium of claim 8, wherein the content template includes one or more default parameters for use by the content generation service in generating the new AI-generated content, wherein the request for the AI-generated content comprises one or more parameters, and wherein the parameters in the request for the AI-generated content are used to generate the new AI-generated content instead of the one or more default parameters.

11. The computer-readable storage medium of claim 8, wherein the content template comprises structured data indicating the content generating service to be used to generate the new AI-generated content and having further computer-executable instructions stored thereupon to select the content generation service from a plurality of content generation services based on the content template.

12. The computer-readable storage medium of claim 8, wherein the response to the request further comprises data identifying one or more components utilized by the content generation service to generate the new AI-generated content.

13. The computer-readable storage medium of claim 12, wherein the data identifying the one or more components utilized by the content generation service to generate the new AI-generated content comprises one or more of data identifying a model utilized to generate the new AI-generated content, data identifying a version of the model, data describing a training history of the model, or data identifying infrastructure utilized to execute the model.

14. The computer-readable storage medium of claim 8, wherein the cognition type is warm cognition, the refresh policy specifying a number of requests for AI-generated content after which the new AI-generated content is to be generated in response to a request.

15. A processing system, comprising:

a processor; and a computer-readable storage medium having computer-executable instructions stored thereupon that, when executed by the processing system, cause the processing system to:

receive a request for artificial intelligence (AI)-generated content, the request identifying a content template generated prior to the request, wherein the content template comprises structured data indicating a cognition type and a refresh policy;

retrieve the content template identified by the request from a data store comprising multiple different content templates, wherein the multiple different content templates include at least one content template specifying cold cognition, at least one content template specifying warm cognition, and at least one content template specifying hot cognition;

determine, based on the cognition type indicated in the content template, whether new AI-generated content is to be generated or whether previously generated AI-generated content is to be returned in response to the request, wherein the cognition type is one of:

cold cognition specifying that the previously generated AI-generated content is to be returned, warm cognition specifying that a determination of whether to generate the new AI-generated content is based upon the refresh policy, or hot cognition indicating that the new AI-generated content is to be generated;

responsive to determining that the new AI-generated content is to be generated, cause a content generation service to generate the new AI-generated content based on the content template; and return a response to the request, the response comprising an identifier for the new AI-generated content.

16. The processing system of claim 15, wherein the cognition type is warm cognition, the refresh policy specifies the amount of time after which the new AI-generated content is to be generated in response to a request.

17. The processing system of claim 15, wherein parameters defined by the request for the AI-generated content are used to generate the new AI-generated content in place of one or more default parameters in the content template.

18. The processing system of claim 15, wherein the content generation service is selected from a plurality of content generation services based on the content template.

19. The processing system of claim 15, wherein the response further comprises one or more of data identifying a model utilized to generate the new AI-generated content, data identifying a version of the model, data describing a training history of the model, and data identifying infrastructure components utilized to execute the model.

20. The processing system of claim 15, wherein the cognition type is warm cognition, the refresh policy specifying a number of requests for AI-generated content after which the new AI-generated content is to be generated in response to a request.

* * * * *